United States Patent
Brede et al.

(10) Patent No.: US 7,222,561 B2
(45) Date of Patent: May 29, 2007

(54) PYROMECHANICAL CUTTING ELEMENT

(75) Inventors: Uwe Brede, Fuerth (DE); Gerhard Kordel, Nuernberg-Komburg (DE); Jurgen Knauss, Obermichelbach (DE); Reinhold Meisinger, Nurnburg (DE)

(73) Assignee: Delphi Technologies, Inc., Troy, MI (US)

( * ) Notice: Subject to any disclaimer, the term of this patent is extended or adjusted under 35 U.S.C. 154(b) by 58 days.

(21) Appl. No.: 10/768,698

(22) Filed: Feb. 2, 2004

(65) Prior Publication Data

US 2004/0221638 A1    Nov. 11, 2004

(30) Foreign Application Priority Data

| Feb. 4, 2003 | (DE) | 103 04 528 |
| Feb. 21, 2003 | (DE) | 103 07 706 |
| Aug. 19, 2003 | (DE) | 103 37 958 |

(51) Int. Cl.
  *D26D 5/08* (2006.01)
  *H01H 39/00* (2006.01)

(52) U.S. Cl. ............ 83/639.4; 83/580; 200/61.08; 200/151; 60/632; 337/157; 337/158; 337/333; 220/261

(58) Field of Classification Search ............ 83/639.4, 83/580, 639; 180/279, 271; 307/10.1, 97, 307/99, 116, 157; 164/86; 200/61.08, 151, 200/316, 306; 102/263, 262, 216, 201; 220/261; 337/279, 158, 3, 157, 354, 346, 267; 60/632, 60/635, 637, 638
See application file for complete search history.

(56) References Cited

U.S. PATENT DOCUMENTS

| 2,443,238 | A | * | 6/1948 | Glanzer | 55/385.1 |
| 2,892,062 | A | * | 6/1959 | Heyser et al. | 337/290 |
| 3,003,045 | A | * | 10/1961 | Tichenor | 200/61.08 |
| 3,111,808 | A | * | 11/1963 | Fritz | 60/635 |
| 3,246,396 | A | * | 4/1966 | Temple et al. | 30/277 |
| 3,393,605 | A | * | 7/1968 | Parnell | 89/1.14 |
| 3,715,697 | A | * | 2/1973 | Them | 337/157 |
| 3,803,374 | A | * | 4/1974 | Delgendre et al. | 200/61.08 |
| 3,810,671 | A | * | 5/1974 | Jeffery | 294/82.29 |
| 3,848,100 | A | * | 11/1974 | Kozorezov et al. | 200/61.08 |
| 3,885,484 | A | * | 5/1975 | Sturgis | 83/580 |
| 3,895,552 | A | * | 7/1975 | Lagofun | 83/580 |
| 3,915,236 | A | * | 10/1975 | Stichling | 169/61 |
| 3,929,308 | A | * | 12/1975 | Armstrong et al. | 246/169 A |
| 4,224,487 | A | * | 9/1980 | Simonsen | 200/61.08 |

(Continued)

*Primary Examiner*—Boyer D. Ashley
*Assistant Examiner*—Ghassem Alie
(74) *Attorney, Agent, or Firm*—Doug Fekete

(57) ABSTRACT

A pyromechanical cutting element has a housing (2) in which an electrical conductor (3) is arranged, a cutting plunger (5) with a cutting tool (8) to cut through the electrical conductor (3), and pyrotechnic charge (13) to drive the cutting plunger (5), with the cutting tool (8) bending over the electrical conductor (3) after cutting through it and forming a bending tongue (18) that sticks out from the conductor (3) in a way that interrupts the conductor (3). The electrical conductor (3) has a cross-sectional area reduction in the longitudinal direction (4) consisting of two transverse sides and two longitudinal sides. The cutting tool (8) first cuts through the cross-sectional area reduction (4) just on one transverse side and upon further advancement bends over the longitudinal sides at least in part, and, upon further advancement, the cutting tool (8) clamps the bending tongue (18) thus created.

11 Claims, 4 Drawing Sheets

U.S. PATENT DOCUMENTS

Figure 1:
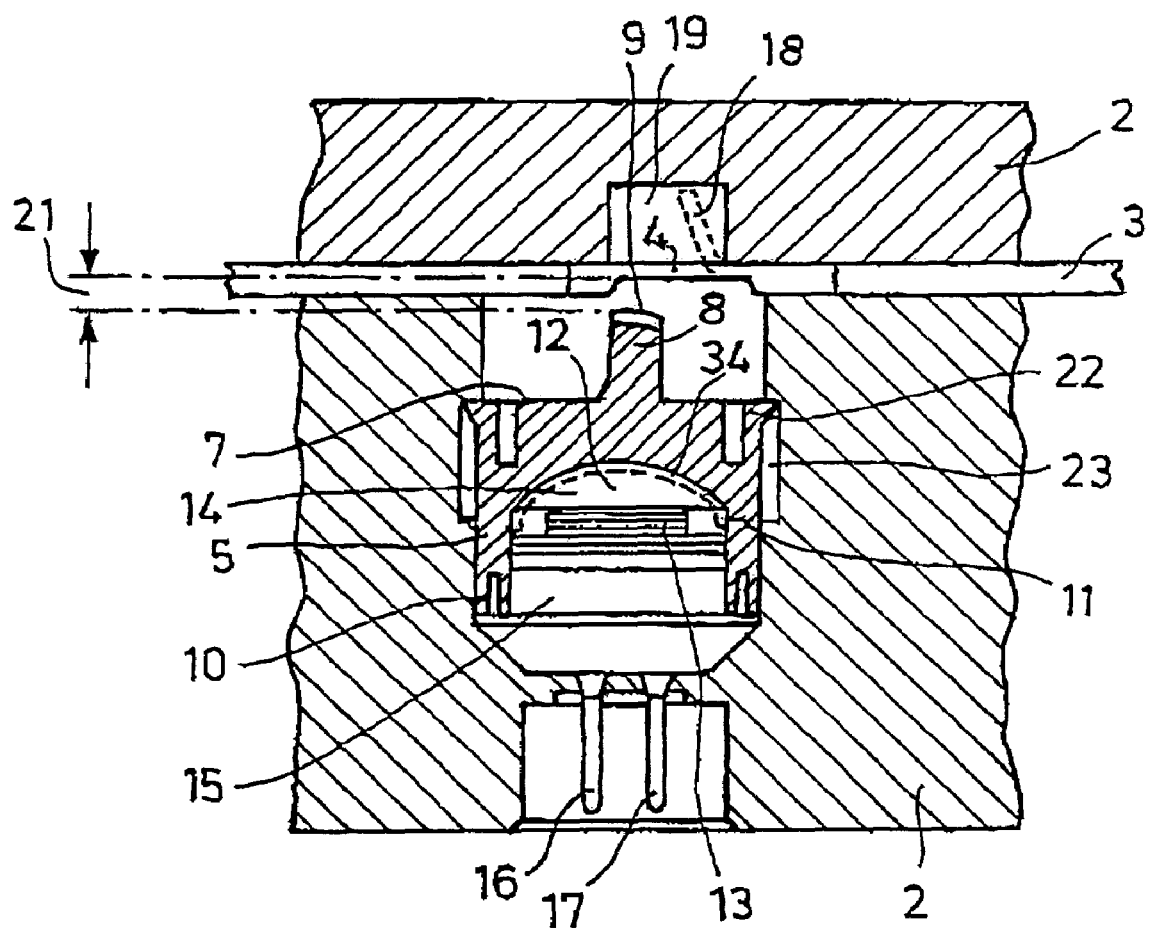

| | | | | |
|---|---|---|---|---|
| 4,331,947 A | * | 5/1982 | Noerholm | 337/159 |
| 4,417,519 A | * | 11/1983 | Lutz | 102/263 |
| 4,648,460 A | * | 3/1987 | McCulloch | 169/57 |
| 4,920,446 A | * | 4/1990 | Pflanz | 361/93.7 |
| 5,222,466 A | * | 6/1993 | Gratziani | 123/193.6 |
| 5,361,676 A | * | 11/1994 | Gibbs | 89/1.14 |
| 5,535,842 A | * | 7/1996 | Richter et al. | 180/279 |
| 5,585,606 A | * | 12/1996 | Ricks | 200/61.08 |
| 6,000,311 A | * | 12/1999 | Katoh et al. | 83/639.4 |
| 6,160,471 A | * | 12/2000 | Rybka et al. | 337/278 |
| 6,194,988 B1 | * | 2/2001 | Yamaguchi et al. | 337/157 |
| 6,496,098 B1 | * | 12/2002 | Kern et al. | 337/401 |
| 6,556,119 B1 | * | 4/2003 | Lell | 337/157 |
| 6,640,719 B1 | * | 11/2003 | Pacella et al. | 102/227.1 |
| 2004/0107856 A1 | * | 6/2004 | Hennings et al. | 102/202.7 |
| 2004/0230163 A1 | * | 11/2004 | Chen | 604/240 |
| 2005/0029856 A1 | * | 2/2005 | Weyhmueller et al. | 297/464 |
| 2006/0091683 A1 | * | 5/2006 | Hawthorne | 294/82.28 |
| 2006/0218918 A1 | * | 10/2006 | Hirooka et al. | 60/512 |

* cited by examiner a)

b)

c)

d)

e)

PYROMECHANICAL CUTTING ELEMENT

BACKGROUND OF THE INVENTION

The invention relates to a pyromechanical cutting or separating element.

DE 197 32 650 A1 describes a pyromechanical cutting element having a housing, in which an electrical conductor is arranged, having a cutting plunger with a cutting tool to cut through the electrical conductor, and having a pyrotechnic charge to drive the cutting plunger, with the cutting tool bending the electrical conductor over after cutting through it and a bending tongue being formed thereby that sticks out from the conductor in a way that interrupts the conductor.

Such cutting elements can be used, for example, to interrupt the current supply to the on-board system of a motor vehicle. In the event of an accident, these cutting elements are triggered, as a result of which the current supply is interrupted and the risk of fire is thereby reduced.

SUMMARY OF THE INVENTION

The underlying object of the invention is to develop further a cutting element in such a way that the electrical conductor can be cut in a reliable manner and with little expenditure of pyrotechnically generated energy as well.

In accordance with the invention, this object is achieved in that in the longitudinal direction the electrical conductor has a cross-sectional area reduction consisting of two transverse sides and two longitudinal sides, in that the cutting tool first cuts through the cross-sectional area reduction just on one transverse side and upon further advancement bends over the longitudinal sides at least in part, and in that upon further advancement the cutting tool fixedly clamps the bending tongue thus created.

As a result of the cross-sectional area reduction, the expenditure of pyrotechnic energy by the cutting element is significantly lower. So that the bent-over bending tongue sticks out from the electrical conductor at all events, the cutting tool, after cutting through the transverse side, upon further advancement fixedly clamps the bending tongue so that no further through-contacting of the electrical conductor is possible.

In an advantageous development, the cutting plunger has lateral latching tongues which in the deflected state of the cutting plunger latch into shaped grooves of the housing that are provided and fix the cutting plunger in the deflected state. These lateral latching tongues are preferably arranged at that end of the cutting plunger that faces the pyrotechnic charge.

In order to secure the cutting plunger and thus the cutting tool against rotation, on its outer face the cutting plunger has longitudinally extending guide ribs that engage into corresponding guide grooves in the housing.

The cutting tool expediently projects above the bending tongue in the deflected state.

The cutting tool is preferably made from a fibre-reinforced plastics material.

In a further advantageous development, the cutting plunger has further lateral latching tongues which latch into corresponding shaped grooves in the housing in the non-deflected state of the cutting plunger. As a result, damming of the cutting plunger when triggered is achieved, that is, the cutting plunger only starts to more when there is a comparatively high pressure.

The lateral latching tongues are advantageously formed so as to be resilient.

Advantageously provided in the cutting plunger, at the end that faces the pyrotechnic charge, there is a retaining filter that is preferably made of wire mesh and absorbs possible residues of combustion of the ignited pyrotechnic charge.

BRIEF DESCRIPTION OF THE SEVERAL VIEWS OF DRAWINGS

The invention is explained in greater detail in the following with the aid of figures.

Figure 2:
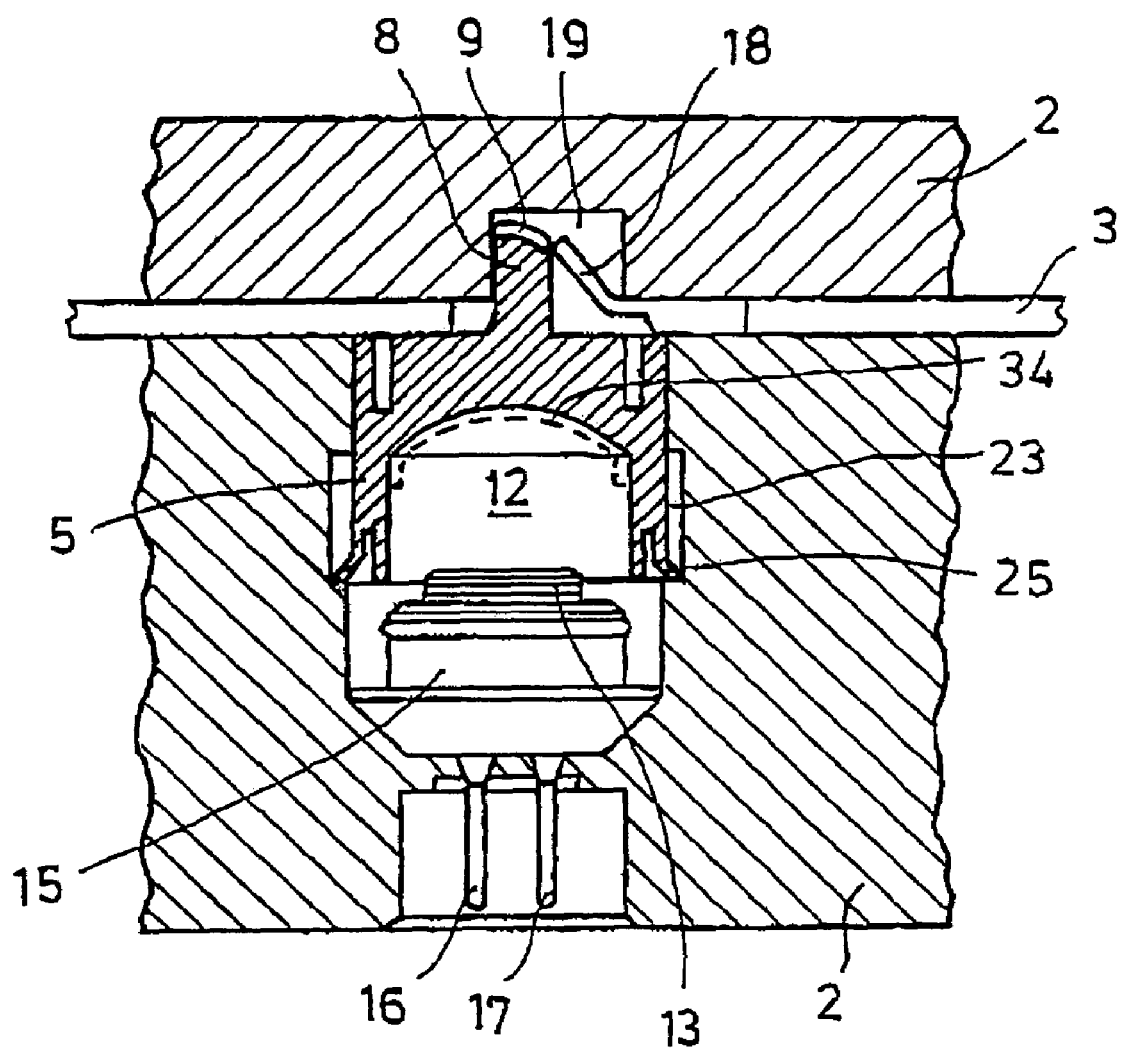
Figure 3:
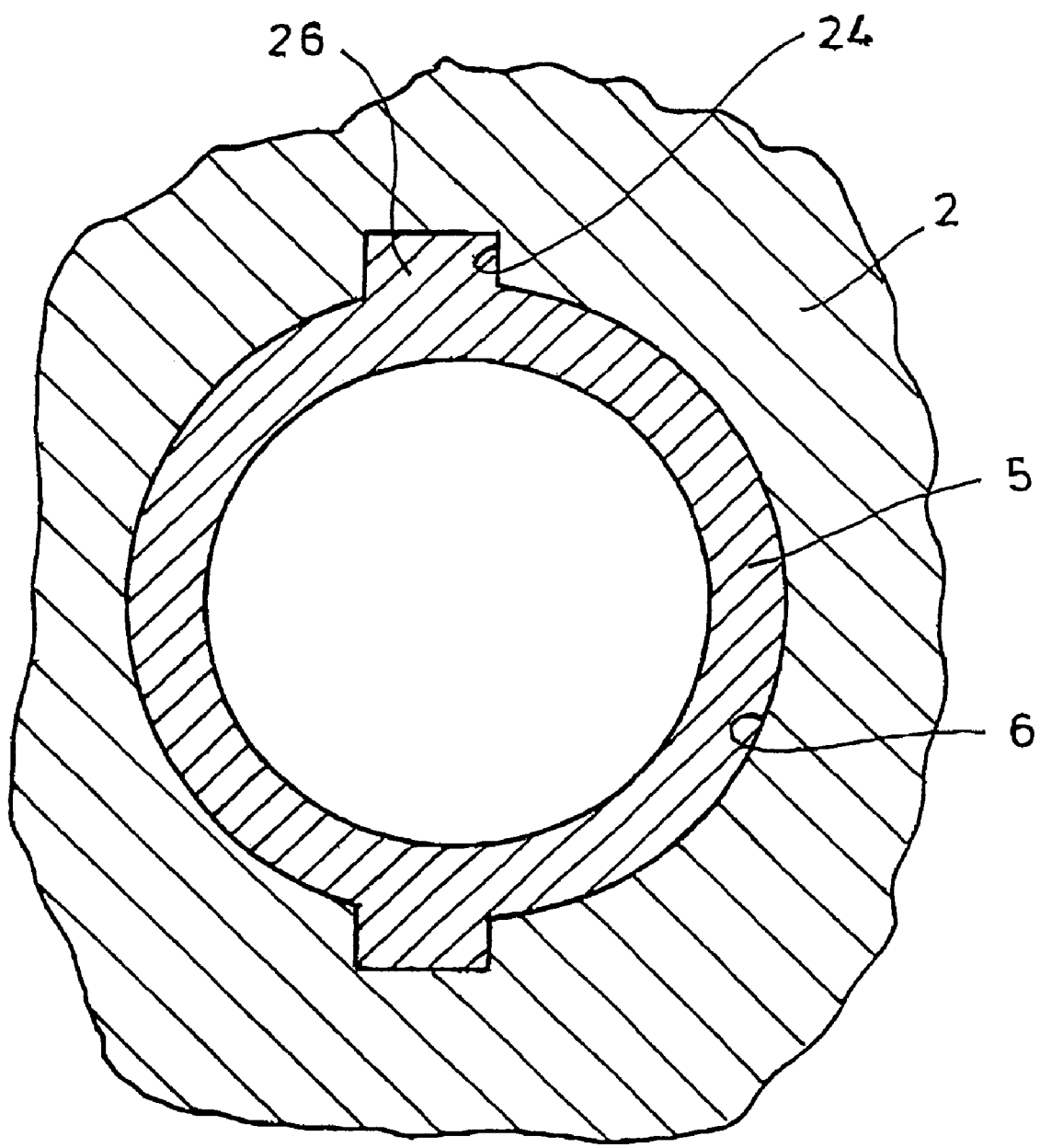
Figure 4:
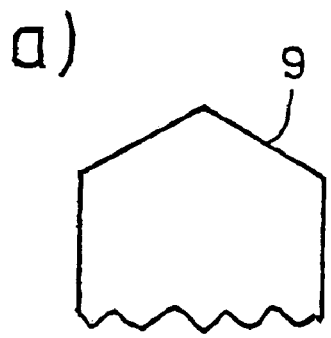
Figure 4:
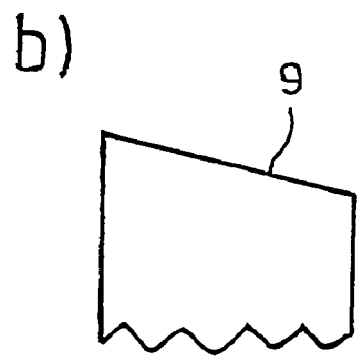
Figure 4:
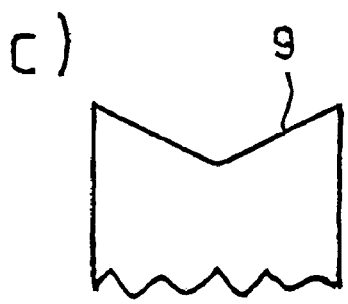
Figure 4:
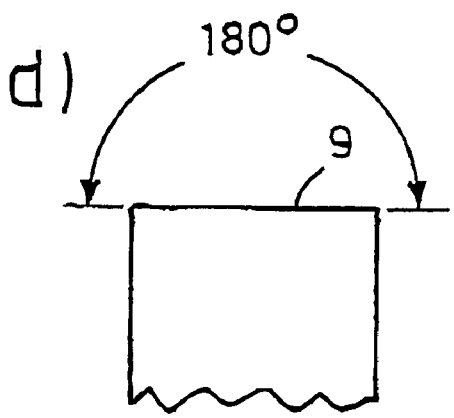
Figure 4:
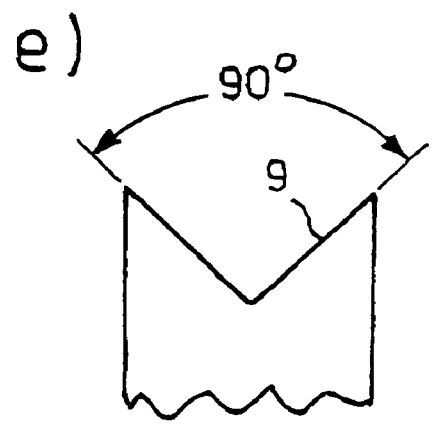

FIG. 1 is a sectional view of a pyromechanical cutting element according to an exemplary embodiment of the present invention, FIG. 2 is a sectional view showing a further advantageous embodiment for fixing the cutting plunger in the final position, FIG. 3 is a sectional view showing how the cutting plunger is arranged in the housing, FIGS. 4a–4e show different embodiments for the shape of the cutting edge of the cutting plunger.

DETAILED DESCRIPTION OF THE INVENTION

An exemplary embodiment of a pyromechanical cutting element in accordance with the invention is shown in FIG. 1. It substantially consists of a solid housing 2, shown in section, that surrounds an electrical conductor 3 which has the form of a plate rail and has a cross-sectional area reduction 4 at a designated cutting point. The cross section of this cross-sectional area reduction 4, also called the cutting point below, must be dimensioned to match the material of the conductor in such a way that, on the one hand, it does not give rise to any additional electrical resistance and, on the other hand, it enables the conductor to be cut through completely with the aid of the cutting element. Copper, brass and possibly aluminum are preferred materials for the conductor.

The electrical conductor 3 is cut by means of a so-called cutting plunger 5. The cutting plunger 5 is guided in a bore 6 that is arranged in the housing 2 (see FIG. 3). The bore 6 extends perpendicularly towards the conductor 3 and is closed off by the latter's cross-sectional area reduction 4. The cutting plunger 5 bears a cutting tool 8 on its end face 7 that faces the cutting point 4 of the conductor 3. The cutting tool 8 has a cutting edge 9 to destroy the cutting point 4 in the conductor 3. The shape of the cutting edge 9 must be matched to the material that is to be cut through. It is either V-shaped, shaped so that it tapers to a point or shaped so that it extends obliquely (see FIG. 4). The shapes specified have the advantage that the cutting edge 9 does not immediately strike the cutting point 4 with the full width of the cutting tool 8, but penetrates into the material starting at two or one point(s) of impact. In the case of a V-shaped cutting edge, the cutting force becomes increasingly smaller with a decreasing angle of spread of the two V-legs.

Located on the side that is remote from the cutting point 4, a base 10 of the cutting plunger 5, there is a space 12 that is surrounded by the plunger wall 11. It contains the propellant charge 13 to drive the cutting plunger 5 and an empty space 14 which is arranged between the base side 10 and the propellant charge 13 and on ignition is used to build up the driving pressure.

It can be seen from FIG. 1 that a retaining filter 34 in the form, for example, of a wire mesh, can be located in the empty space 14 of the cutting plunger 5 in order to absorb the residues of combustion of the pyrotechnic driving charge 13.

The driving charge 13 can lie on the igniter 15, in which an initial charge that is not described in greater detail is located, or it is already integrated in the igniter 15. The ignition can be effected electrically, as indicated in the present exemplary embodiment by means of the two terminals 16 and 17. To this end, the terminals 16 and 17 are, for example, connected to the control circuit of sensors which trigger the airbags in the event of an accident of a motor vehicle. However, mechanical triggering can also take place, for example by means of a firing pin which is driven into the fuse composition on account of deformation of parts of the bodywork.

The cutting plunger 5 or at least the cutting tool 8 must consist of a non-conductive material which is configured in accordance with the invention in such a way as to cut through the material of the electrical conductor 3. Plastics materials which are hardened by additives or fillers are suitable. Advantageously, ceramic materials are also suitable, in particular in compositions as provided for tools in the metal-processing industry. Such ceramic materials that can bear impact loads are advantageous.

When the driving charge 13 is ignited by way of the Igniter 15, the cutting plunger 5 is accelerated in the direction of the cutting point 4 of the electrical conductor 3. After covering the free-flight path 21, the cutting plunger with a cutting tool 8 meets with the cutting point 4 of the electrical conductor 3. The cutting edge 9 cuts through the conductor just at one point and bends away a tongue-shaped portion 18 of the conductor 3 at the point of its smallest cross section into a recess 19 of the housing 2 specifically provided therefor, as indicated by the bending tongue 18 shown in the bent-up state. The flow of current is thus interrupted.

As a result of this advantageous cutting arrangement in accordance with the invention the expenditure of pyrotechnically generated energy is less than that of the known punching solutions in accordance with the prior art.

When using a pyromechanical cutting element it is important that the cut of the conductor 3 and thus the interruption of the flow of current is maintained. This is best achieved if the cutting tool 8 after cutting through the conductor 3 at the cutting point 4 remains secured at the place it has reached and as a result prevents possible mechanical contact of the cut conductor ends. In accordance with the invention, this is achieved by the clamping effect of the bending tongue 18 that is formed after the cutting process (see FIG. 2).

In accordance with the invention, the positioning of the cutting tool 8 in the rest position is fixed in that the cutting plunger 5 is equipped with a latching device, as shown in an exemplary embodiment in FIG. 1. Located on the outer wall of the cutting plunger 5 there is, for example, an outwardly pointing spring element or latching tongues 22. In the rest position, this spring element stands opposite a shaped groove 23 in the bore 6 of the housing 2. It spreads out, penetrates into the shaped groove 23 and is thereby prevented from sliding out of its starting position.

A further advantageous embodiment for fixing the cutting plunger 5 in the final position (after the cutting process) is shown in FIG. 2.

The positioning of the cutting tool 8 in the final position is fixed in that the cutting plunger 5 is equipped with a further latching device, as shown in the exemplary embodiment in accordance with FIG. 2. Located on the outer wall of the cutting plunger 5 there is a further outwardly pointing spring element or latching tongues 25. In the final position of the cutting plunger this spring element 25 stands opposite the groove 23 in the bore 6 of the housing 2. It spreads out, penetrates into the groove 23 and is thereby prevented from sliding back out of its end position after the cutting process.

So that the cutting edge 9 of the cutting tool 8 strikes the cutting point 4 in the conductor 3 at the intended point, the cutting tool 5 can be secured against rotation. To secure the cutting tool against rotation at least one guide groove 24 can be provided in the bore 6 into which a guide rib 26 on the outer wall of the cutting plunger 5 engages, as shown in FIG. 3.

The pyrotechnic charge must be matched to the material that is to be cut through and the cross section of the conductor so that it is possible to cut through the latter in a reliable manner. The cutting power that is to be applied is to be matched to the coefficient of elongation at break of the material that is to be cut, the shaping of the cutting tool and also the latter's material properties and the kinetic energy with which the cutting tool meets with the material that is to be cut. In the case of brittle materials, for example, a short heavy blow of the cutting tool is required, whilst in the case of though materials, for example in the case of copper alloys, the pressure on the cutting tool must last longer, because during the cutting process a material elongation occurs first before the cut.

FIG. 4a shows a cutting tool with a cutting edge 9 that tapers to a point. FIG. 4b shows a cutting edge that runs in obliquely, and FIG 4c shows a V-shaped cutting edge 9. FIG. 4d shows a cutting tool with a V-shaped cutting edge 9 with an angle of 180°; and FIG. 4e shows a cutting edge 9 that is V-shaped with an angle of 90°.

The invention claimed is:

1. A pyromechanical cutting element comprising:
a housing in which an electrical conductor is arranged;
a cutting plunger with a cutting tool to cut through the electrical conductor; and
a pyrotechnic charge to drive the cutting plunger, with the cutting tool bending the electrical conductor over after cutting through it and forming a bending tongue that sticks out from the conductor in a way that interrupts the conductor,
wherein the electrical conductor has a cross-sectional area reduction in the longitudinal direction consisting of two transverse sides and two longitudinal sides, wherein the cutting tool is shaped to first cut through the cross-sectional area reduction of the electrical conductor just on one transverse side and, upon further advancement, bend over the longitudinal sides at least in part, and wherein, upon further advancement, the cutting tool fixedly clamps by a locking structure the bending tongue thus created.

2. The pyromechanical cutting element according to claim 1, wherein said locking structure comprises lateral latching tongues on said cutting plunger which in the deflected state of the cutting plunger latch into shaped grooves of the housing that are provided and fix the cutting plunger in the deflected state.

3. The pyromechanical cutting element according to claim 2, wherein the lateral latching tongues are arranged at that end of the cutting plunger that faces the pyrotechnic charge.

4. The pyrotechnical cutting element according to claim 1, wherein the cutting plunger has longitudinally extending guide ribs on its outer face that engage into corresponding guide grooves in the housing.

5. The pyromechanical cutting element according to claim 1, the cutting tool projects above the bending tongue in the deflected state.

6. The pyromechanical cutting element according to claim 1, wherein the cutting tool is made from fibre-reinforced plastics material.

7. The pyromechanical cutting element according to claim 1, wherein the cutting plunger has lateral latching tongues which latch into corresponding shaped grooves of the housing in the non-deflected state of the cutting plunger.

8. The pyromechanical cutting element according to claim 7, wherein the lateral latching tongues are formed so as to be resilient.

9. The pyromechanical cutting element according to claim 1, further comprising a retaining filter that absorbs possible residues of combustion of the ignited pyrotechnic charge provided at a side of the cutting plunger facing the pyromechanical charge.

10. The pyromechanical cutting element according to claim 9, wherein the retaining filter is made of wire mesh.

11. The pyromechanical cutting element according to claim 2, wherein the lateral latching tongues are formed so as to be resilient.

* * * * *